United States Patent
Brandt et al.

(10) Patent No.: US 10,297,851 B2
(45) Date of Patent: May 21, 2019

(54) FUEL CELL ASSEMBLY AND METHOD FOR OPERATING A FUEL CELL ASSEMBLY

(71) Applicant: Siemens Aktiengesellschaft, Munich (DE)

(72) Inventors: Torsten Brandt, Forchheim (DE); Armin Datz, Poxdorf (DE); Albert Hammerschmidt, Erlangen (DE); Silke Latzel, Kleinsendelbach (DE); Josef Lersch, Heroldsbach (DE); Arno Mattejat, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 286 days.

(21) Appl. No.: 15/500,375

(22) PCT Filed: Jul. 29, 2015

(86) PCT No.: PCT/EP2015/067341
§ 371 (c)(1),
(2) Date: Jan. 30, 2017

(87) PCT Pub. No.: WO2016/016288
PCT Pub. Date: Feb. 4, 2016

(65) Prior Publication Data
US 2017/0214074 A1  Jul. 27, 2017

(30) Foreign Application Priority Data
Aug. 1, 2014  (EP) .................................... 14179498

(51) Int. Cl.
*H01M 8/0284*  (2016.01)
*H01M 8/1004*  (2016.01)
(Continued)

(52) U.S. Cl.
CPC ........... *H01M 8/1004* (2013.01); *H01M 4/92* (2013.01); *H01M 8/0267* (2013.01); *H01M 8/0284* (2013.01); *H01M 2008/1095* (2013.01)

(58) Field of Classification Search
CPC .. H01M 8/1004; H01M 8/028; H01M 8/0284; H01M 8/0286
See application file for complete search history.

(56) References Cited

U.S. PATENT DOCUMENTS 8,617,760 B2   12/2013 Fay et al.
2005/0181267 A1*  8/2005 Mitsuta ............... H01M 8/0284
429/483
(Continued)

FOREIGN PATENT DOCUMENTS

| JP | 2009-158160 | 7/2009 |
|---|---|---|
| KR | 20070057151 | 6/2007 |
| WO | WO 2005/035247 | 4/2005 |

*Primary Examiner* — Maria Laios
(74) *Attorney, Agent, or Firm* — Cozen O'Connor

(57) ABSTRACT

A fuel cell assembly with at least one proton exchange membrane (PEM) fuel cell for generating electrical energy from the reactant gases hydrogen and oxygen, which includes at least one membrane/electrode unit having a membrane that is coated with platinum electrodes and, respectively positioned on each side thereof, a porous gas diffusion layer, or which has a membrane and, respectively positioned on each side thereof, a porous gas diffusion layer that is coated with a platinum electrode, and which includes bipolar plates that lie against the gas diffusion layers and through which, during operation, a coolant flows, where access by at least one of the reactant gases to the membrane is blocked by a mechanical block for a part of an edge region of the membrane/electrode unit In order to prevent damage to the membrane.

17 Claims, 4 Drawing Sheets

(51) Int. Cl.
*H01M 4/92* (2006.01)
*H01M 8/0267* (2016.01)
*H01M 8/1018* (2016.01)

(56) References Cited

U.S. PATENT DOCUMENTS

| | | |
|---|---|---|
| 2006/0127738 A1 | 6/2006 | Sompalli et al. |
| 2007/0134538 A1 | 6/2007 | Yuichi et al. |
| 2008/0090131 A1* | 4/2008 | de Rouffignac .... H01M 8/0273 429/480 |
| 2009/0104507 A1* | 4/2009 | Ohma ................... H01M 4/881 429/483 |
| 2009/0162734 A1* | 6/2009 | Yandrasits .......... H01M 8/0271 429/514 |
| 2010/0000679 A1 | 1/2010 | Han et al. |

* cited by examiner

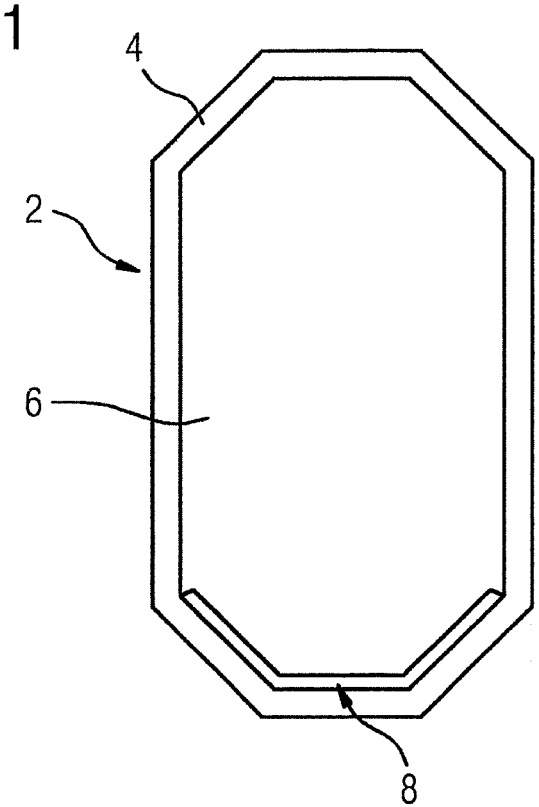
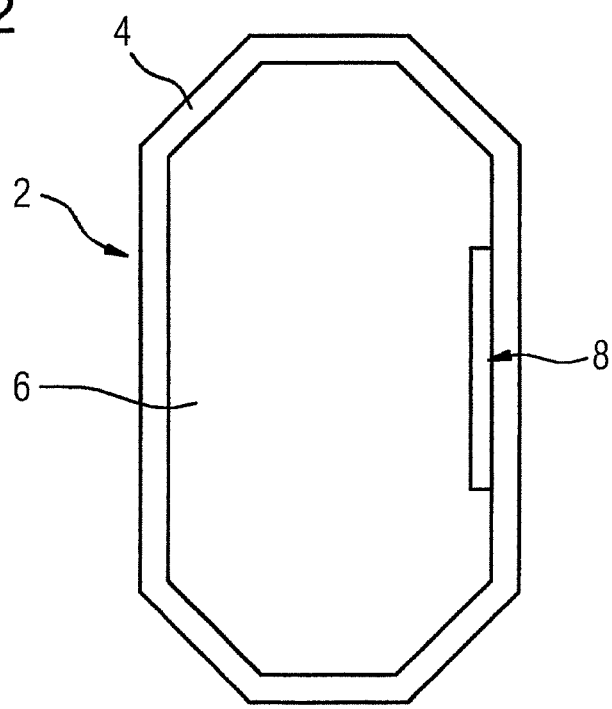

FUEL CELL ASSEMBLY AND METHOD FOR OPERATING A FUEL CELL ASSEMBLY

CROSS-REFERENCE TO RELATED APPLICATIONS

This is a U.S. national stage of application No. PCT/EP2015/067341 filed 29 Jul. 2015. Priority is claimed on European Application No. 14179498 filed 01 Aug. 2014, the content of which is incorporated herein by reference in its entirety.

BACKGROUND OF THE INVENTION

1. Field of the Invention

The invention relates to a fuel cell assembly with at least one proton exchange membrane (PEM) fuel cell for generating electrical energy from the reactant gases hydrogen and oxygen, comprising at least one membrane/electrode unit which has a membrane coated with platinum electrodes and has, respectively positioned on each side thereof, a porous gas diffusion layer, or which has a membrane and, respectively positioned on each side thereof, a porous gas diffusion layer that is coated with a platinum electrode, and further comprises bipolar plates which lie against the gas diffusion layers and through which, during operation, a coolant flows. The invention further relates to a method for operating a fuel cell assembly of this type.

2. Description of the Related Art

In proton exchange membrane (PEM) fuel cells, in an electrochemical process, electric current, heat and water are formed from hydrogen and oxygen. The fundamental construction is configured such that gas chambers and cooling chambers in "bipolar plates" adjoin a membrane/electrode unit (or membrane electrode assembly (MEA)). The membrane/electrode unit contains, in particular, a proton-conducting membrane that is coated on both sides with platinum electrodes (catalyst layer). These, in turn, are covered by a gas-permeable, electrode-conducting gas diffusion layer. Alternatively, the gas diffusion layer can also be coated with the platinum electrode (catalyst layer) on a side facing toward the membrane. The gas diffusion layer also has the task of removing the product water on the cathode side from the production zone on the border layer with the platinum electrode and the membrane. For this purpose, the gas diffusion layer, which is typically made of carbon fiber material (carbon paper, carbon fiber fabric or nonwoven fabric), is made hydrophobic on the surface, i.e., on the carbon fibers or in the hollow spaces.

Heat produced during fuel cell operation is usually removed from the bipolar plate by a coolant flow, in particular a cooling water flow. As a result, a thermal gradient forms in the bipolar plate from the coolant entry to the coolant exit, i.e., a higher temperature prevails in the region of the coolant exit than at the coolant entry. The reactant (oxygen and hydrogen) exit is also often situated in the region of the coolant exit. On the oxygen side, a large quantity of product water arises that must be completely removed from the gas diffusion layer. On the hydrogen side, in this region, the hydrogen can be effectively converted due to the very good flow. With this, in the region of the conversion of the hydrogen which is already heated by the coolant flow, additional waste heat arises, which can lead to a further temperature rise.

In an ideal case, there is an evenly rising temperature gradient between the coolant entry and exit with little or no temperature rises at the corners or edges of the bipolar plate.

In reality, however, at sites critical to flow dynamics (e.g., dead zones, corners) significant temperature increases (for example, 10 to 20 Kelvin as compared with the coolant exit) can arise. This effect can be further strengthened in these critical regions if the coolant water flow of the bipolar plate is significantly reduced, for example, due to faults (blocking of cooling channels, or unintended reduction of the coolant water pump output). In an extreme case, this can lead via different mechanisms (for example, low humidity—formation of hydrogen peroxide and consequent chemical attack on the membrane, mechanical loading by means of humid/dry cycles) to mechanical weakening of the membrane or thickness reduction and even hole formation, which leads to the failure of the cell and thus of the overall fuel cell stack.

Conventionally, the problem is typically handled by attempting, with a suitable optimization of the flow geometry of the bipolar plate, to prevent such hot points.

U.S. Pat. No. 8,617,760 B2 describes another solution. According to this document, the proton-conducting membrane is deactivated in the critical regions via the incorporation of metal ions.

U.S. 2009/0162734 A1 discloses a fuel cell assembly with a PEM fuel cell, where over the entire edge region of the membrane/electrode unit, i.e., the entire region around the outer periphery of the membrane/electrode unit, access by at least one of the reactant gases to the membrane is blocked by a resin layer. The platinum electrode has a smaller area than the gas diffusion layer, where over the entire edge region of the membrane/electrode unit, the gas diffusion layer protrudes beyond the platinum electrode. With this protrusion, in conjunction with a seal extending round the entire edge region of the membrane/electrode unit and the resin layer extending round the entire edge region of the membrane/electrode unit, the contact between the gas diffusion layer and the membrane/electrode unit and their sealing can be improved.

U.S. 2006/127738 A1 discloses a fuel cell construction in which, over the entire edge region of the membrane/electrode unit, an adhesive is arranged between the membrane and the gas diffusion layers. As the adhesive, a substance, such as acrylic or thermoplastic elastomers, can be used. The presence of the adhesive reduces the stretch loading at the edges of the membrane that are not supported by electrodes. The adhesive acts as a sealant and thus prevents a chemical degradation of the membrane. The gas diffusion layers are porous. As a result, the adhesive can penetrate into the pores of the gas diffusion layers.

SUMMARY OF THE INVENTION

It is an object of the invention, with a pre-defined geometry of the bipolar plate and without major detriment in the generation of the electrical energy, to define measures in the region of the membrane/electrode unit which prevent the aforementioned faults.

This and other objects and advantages are achieved in accordance with the invention via a fuel cell assembly with at least one proton exchange membrane (PEM) fuel cell for generating electrical energy from the reactant gases hydrogen and oxygen, comprising at least one membrane/electrode unit having a membrane coated with platinum electrodes and having, respectively positioned on each side thereof, a porous gas diffusion layer, and further comprising bipolar plates that lie against the gas diffusion layers and through which, during operation, a coolant flows, where for a part of an edge region of the membrane/electrode unit, access by at least one of the reactant gases to the membrane is blocked (unblocked) by a mechanical block and for another part of the edge region of the membrane/electrode unit, access by the at least one of the reactant gases to the membrane is not blocked by a mechanical block.

It is also an object of object the invention to provide a method for operating the fuel cell system in accordance with the invention, where for a part of an edge region of the membrane/electrode unit, access by at least one of the reactant gases to the membrane is blocked by a mechanical block and, for another part of the edge region of the membrane/electrode unit, access by the at least one of the reactant gases to the membrane is not blocked (unblocked) by a mechanical block.

As is clear to a person skilled in the art, the advantages disclosed below with regard to the fuel cell and the method and preferred embodiments can also be passed on to a fuel cell, where the gas diffusion layer is coated with the platinum electrode (catalyst layer).

The invention is based on the concept, via the mechanical block, of preventing the reactant gases hydrogen and/or oxygen from reaching the electrodes at thermally critical sites. In this way, an electrochemical reaction at the platinum electrode that leads through the production of either heat or potential to a weakening or damaging of the membrane in the observed "endangered" region can be prevented. Through the introduction of the mechanical block into "endangered" regions (i.e., regions that can possibly become too hot or can otherwise be damaged), even with the defined bipolar plate design, failure-free operation can be realized. In the other edge regions without any mechanical block, however, an electrochemical reaction can still occur at the platinum electrode, so that the aforementioned measures are possible without major sacrifices in the generation of the electrical energy in the fuel cell.

Preferably, the mechanical block is provided at the membrane/electrode unit in the region of a coolant exit from the bipolar plate or at thermally loaded sites of the bipolar plate. Due to the temperature gradient between the coolant entry and the coolant exit of the bipolar plate, an increased danger of overheating particularly in the region of the coolant exit exists.

With regard to an efficient effect of the mechanical block, in accordance with a preferred embodiment, the mechanical block is arranged between the gas diffusion layer and the membrane/electrode unit. Thus, the reactant gas can become distributed in the gas diffusion layer but, at the critical sites, does not reach the platinum electrode of the membrane/electrode unit. Advantageously, in this case, the mechanical block is a gas-impermeable film with a low thickness so that the film can be introduced without fault between the gas diffusion layer and the membrane/electrode unit. The film is made, for example, of Teflon. A good oxygen resistance is herein essential to the material selection on the cathode side.

In accordance with a further preferred embodiment, the mechanical block is contained within the pores of the gas diffusion layer. The presently contemplated embodiment is distinguished by configuration changes merely to the gas diffusion layer and all other components of the fuel cell remain unaltered. Herein, the mechanical block is preferably an acrylic adhesive or a fluorothermoplastic. The mechanical block is herein formed from a polymer filler, such as fluorothermoplastic that is introduced via a suitable thermal treatment. On the cathode side, corresponding oxygen-resistance is necessary.

Preferably, the platinum electrode has a smaller area than the gas diffusion layer, where for a part of an edge region of the gas diffusion layer, the platinum electrode is recessed and is replaced by the mechanical block. It is hereby achieved that in the region of the thermally critical sites, no platinum catalyst is present so that no electrochemical potential can be present for the production of hydrogen peroxide. Double safety is ensured in that the site at the surface of the membrane at which the platinum electrode is omitted is covered by the mechanical block.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention will now be described in greater detail making reference to the figures, in which:

FIG. 1 is a first plan view of a membrane/electrode unit and a gas diffusion layer lying thereon, where a first, exemplary, critical region is identified;

FIG. 2 is a second plan view of a membrane/electrode unit and a gas diffusion layer lying thereon, where a second, exemplary, critical region is identified;

DETAILED DESCRIPTION OF THE EXEMPLARY EMBODIMENTS

The same reference signs have the same meaning in the different figures.

Shown in FIGS. 1 and 2, respectively, is a membrane/electrode unit 2 which is part of a fuel cell assembly 3 (not shown here in detail) which consists in the exemplary embodiment shown of a single PEM fuel cell. The PEM fuel cell 3 is shown in cross-section in FIGS. 3 to 5.

Figure 3:
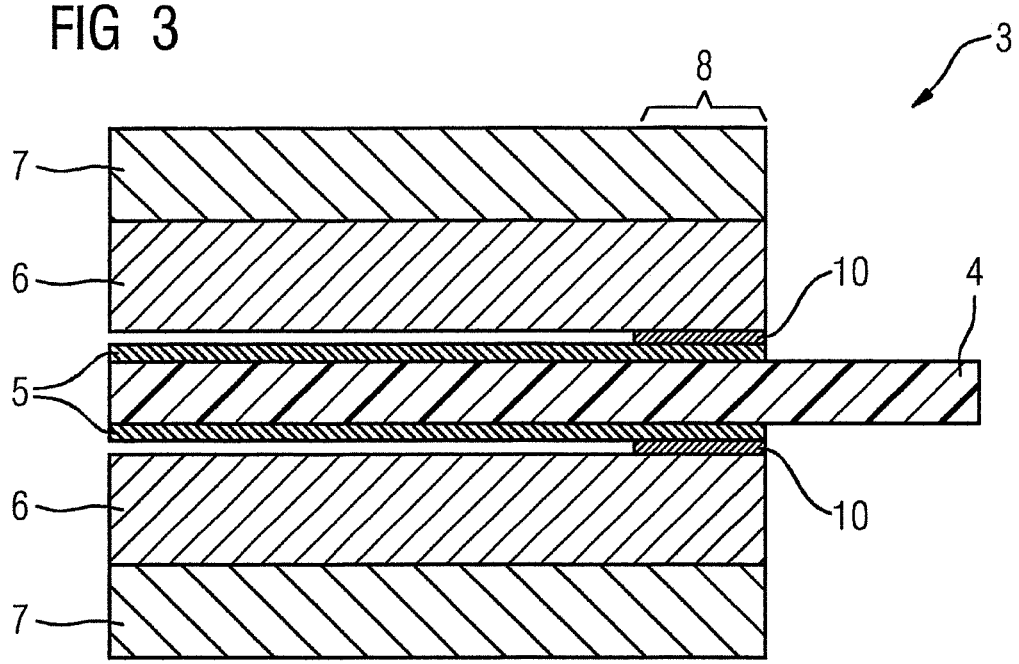
FIG. 3 is a cross-section of a first embodiment of a fuel cell in accordance with the invention.
Figure 4:
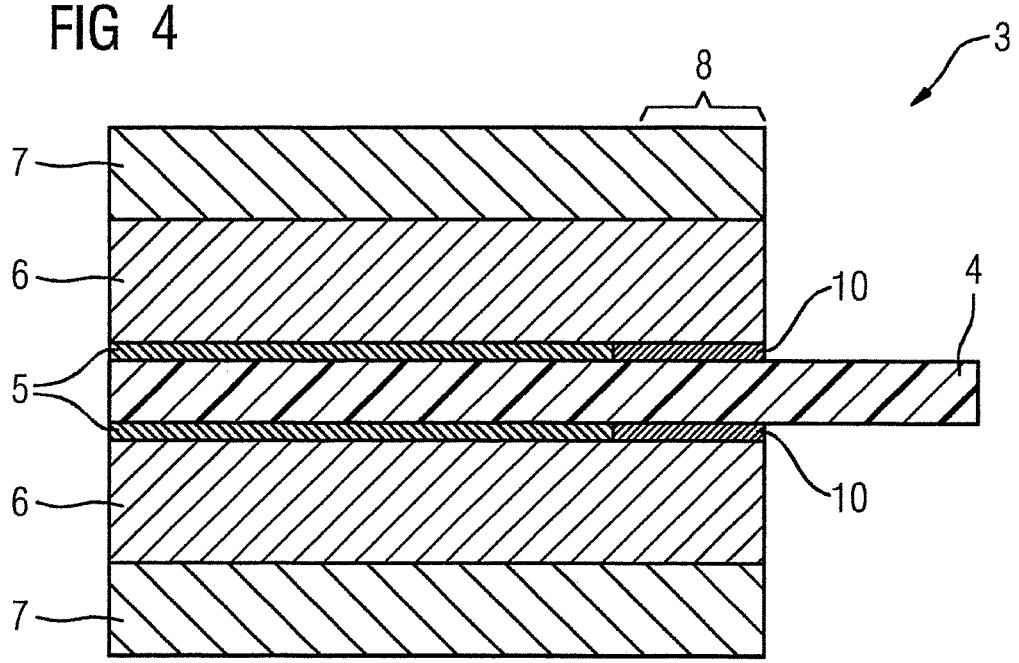
FIG. 4 is a cross-section of a second embodiment of a fuel cell; in accordance with the invention.
Figure 5:
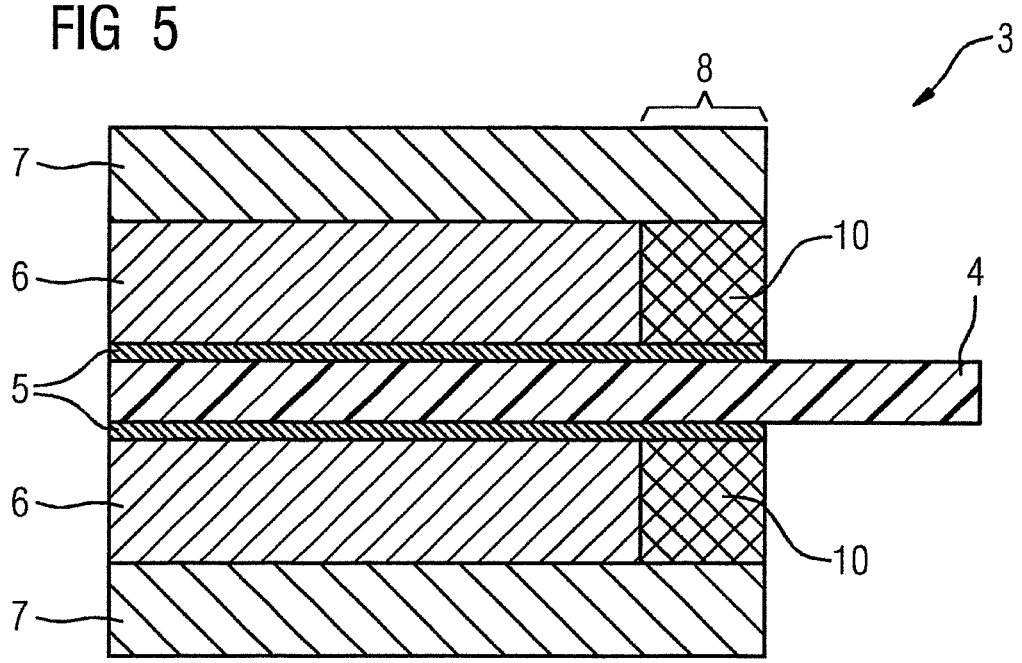
FIG. 5 is a cross-section of a third embodiment of a fuel cell; in accordance with the invention.

The membrane/electrode unit 2 comprises a proton-conducting membrane 4 that is coated on both sides with a catalyst layer of platinum (not shown here) which forms a platinum electrode 5 (see FIGS. 3 to 5). Placed on each side of the membrane 4 is a respective gas diffusion layer 6, which contacts the platinum electrode 5. Alternatively, the catalyst layer of platinum that forms a platinum electrode 5 can also be applied to the side of the gas diffusion layer 6 facing toward the membrane 4.

As shown in FIGS. 3 to 5, the fuel cell 3 also comprises, adjoining the gas diffusion layer 6, a bipolar plate 7 (in reality a space is at least partially present between the bipolar plate 7 and the gas diffusion layer 6) through which during operation a coolant, in particular cooling water, flows. With this, heat generated in the membrane/electrode unit 2 is transported away.

In FIGS. 1 and 2, the reference sign 8 denotes two differently arranged exemplary critical sites at which there is an increased probability that a disruption of the function of the membrane 6 or a local destruction of the membrane 6 can occur. For example, such a critical site 8 is at the coolant exit from the bipolar plate 7, as shown in FIG. 1. The critical sites 8 are always located in the edge region of the membrane/electrode unit 2 or the gas diffusion layer 6.

The edge region is herein understood to be the region around the outer periphery of the membrane/electrode unit 2.

In FIG. 3, a first arrangement of the fuel cell 3 is shown in which at a critical site 8 in the edge region, a mechanical block 10 in the form of a thin film is applied between the membrane/electrode unit 2 and the gas diffusion layer 6. This prevents the respective reactant gas hydrogen and/or oxygen from reaching the platinum electrode 5.

In FIG. 4, a film-like mechanical block 10 is also provided between the membrane/electrode unit 2 and the gas diffusion layer 6, with the difference from FIG. 3 that at the critical site 8, the platinum electrode 5 is recessed and replaced by the film 10.

In FIG. 5, a third alternative embodiment of the fuel cell 3 is shown, where the porous gas diffusion layer 6 is filled with the mechanical block 10, specifically only in the region of the critical site 8. The mechanical block 10 is herein a mass, for example, of a thermoplastic, fluorinated polymer filler, an acrylic adhesive.

Figure 6:
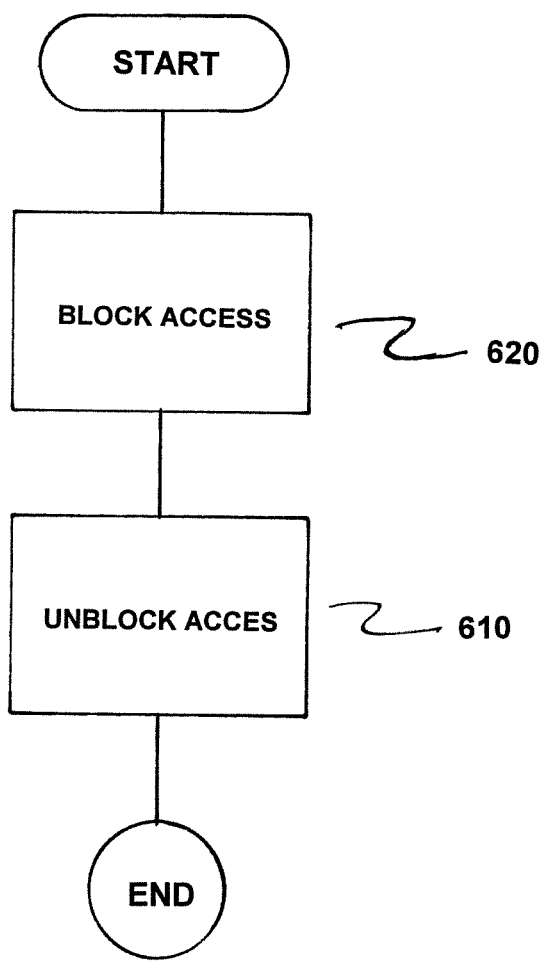
FIG. 6 is a flowchart of the method in accordance with the invention.

FIG. 6 is a flowchart of a method for operating a fuel cell assembly 3 with at least one proton exchange membrane (PEM) fuel cell for generating electrical energy from reactant gases comprising hydrogen and oxygen. The method comprises blocking, by a mechanical block 10, access by at least one of the reactant gases to the membrane 4 for a part of an edge region of the membrane/electrode unit 2, as indicated in step 610.

Next, access by the at least one of the reactant gases comprising hydrogen and oxygen to the membrane 4 is not blocked (unblocked) for another part of the edge region of the membrane/electrode unit 2, as indicated in step 620.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel cell assembly with at least one proton exchange membrane fuel cell for generating electrical energy from reactant gases comprising hydrogen and oxygen, comprising:

at least one membrane/electrode unit including a membrane coated with platinum electrodes and having, respectively positioned on each side thereof, a porous gas diffusion layer; and bipolar plates which lie against the gas diffusion layers and through which, during operation, a coolant flows;

wherein access by at least one of the reactant gases comprising hydrogen and oxygen to the membrane is blocked by a mechanical block for a part of an edge region of the membrane/electrode unit and access by at least one of the reactant gases comprising hydrogen and oxygen to the membrane is unblocked for another part of the edge region of the membrane/electrode unit; and wherein the edge region comprises a region around an outer periphery of the membrane/electrode unit.

2. The fuel cell as claimed in claim 1, wherein the mechanical block is provided at the membrane/electrode unit in one of (i) a region of a coolant exit from the bipolar plate and (ii) at thermally loaded sites of the bipolar plate.

3. The fuel cell as claimed in claim 2, wherein the mechanical block is contained within pores of the gas diffusion layer.

4. The fuel cell as claimed in claim 1, wherein the mechanical block is arranged between the gas diffusion layer and the membrane/electrode unit.

5. The fuel cell as claimed in claim 4, wherein the mechanical block comprises a gas-impermeable film.

6. The fuel cell as claimed in claim 1, wherein the mechanical block is contained within pores of the gas diffusion layer.

7. The fuel cell as claimed in claim 6, wherein the mechanical block comprises one of (i) an acrylic adhesive and (ii) a fluorothermoplastic.

8. The fuel cell as claimed in claim 1, wherein the platinum electrodes have a smaller area than the gas diffusion layer; and wherein the platinum electrode are recessed and replaced by the mechanical block for a part of an edge region of the gas diffusion layer.

9. A fuel cell assembly with at least one proton exchange membrane fuel cell for generating electrical energy from reactant gases comprising hydrogen and oxygen, comprising:

at least one membrane/electrode unit including a membrane and having, respectively positioned on each side thereof, a porous gas diffusion layer coated with platinum electrodes; and bipolar plates which lie against the gas diffusion layers and through which, during operation, a coolant flows;

wherein access by at least one of the reactant gases comprising hydrogen and oxygen to the membrane is blocked by a mechanical block for a part of an edge region of the membrane/electrode unit and access by at least one of the reactant gases comprising hydrogen and oxygen to the membrane is unblocked for another part of the edge region of the membrane/electrode unit; and wherein the edge region comprises a region around an outer periphery of the membrane/electrode unit.

10. The fuel cell as claimed in claim 9, wherein the mechanical block is provided at the membrane/electrode unit in at least one of (i) a region of a coolant exit from the bipolar plate and (ii) at thermally loaded sites of the bipolar plate.

11. The fuel cell as claimed in claim 10, wherein the mechanical block is arranged between the gas diffusion layer and the membrane/electrode unit.

12. The fuel cell as claimed in claim 10, wherein the mechanical block is contained within pores of the gas diffusion layer.

13. The fuel cell as claimed in claim 9, wherein the mechanical block is arranged between the gas diffusion layer and the membrane/electrode unit.

14. The fuel cell as claimed in claim 9, wherein the mechanical block is contained in the pores of the gas diffusion layer.

15. The fuel cell as claimed in claim 14, wherein the mechanical block comprises one of (i) an acrylic adhesive and (ii) a fluorothermoplastic.

16. The fuel cell as claimed in claim 9, wherein the platinum electrodes have a smaller area than the gas diffusion layer; and wherein the platinum electrode are recessed and replaced by the mechanical block for a part of an edge region of the gas diffusion layer.

17. A method for operating a fuel cell assembly with at least one proton exchange membrane (PEM) fuel cell for generating electrical energy from reactant gases comprising hydrogen and oxygen, the method comprising:

blocking, by a mechanical block, access by at least one of the reactant gases to the membrane for a part of an edge region of the membrane/electrode unit; and unblocking access by the at least one of the reactant gases comprising hydrogen and oxygen to the membrane for another part of the edge region of the membrane/electrode unit.

* * * * *